US005637276A

United States Patent [19]

Carnevale et al.

[11] Patent Number: 5,637,276

[45] Date of Patent: Jun. 10, 1997

[54] ELECTRONIC CONCENTRATION CONTROL SYSTEM

[75] Inventors: Claudio Carnevale, Nole Canavese; Davide Coin; Stefano Marica, both of Turin; Gabriele Serra, Sazzaro di Savena; Stefano Sgatti, Imola, all of Italy

[73] Assignee: Magneti Marelli S.p.A., Milan, Italy

[21] Appl. No.: 504,401

[22] Filed: Jul. 19, 1995

[30] Foreign Application Priority Data

Jul. 19, 1994 [IT] Italy ................................ TO94A0594

[51] Int. Cl.[6] .......................... G01N 31/12; G01N 27/00; B01D 50/00; F01N 3/00

[52] U.S. Cl. ............................. 422/94; 422/98; 422/108; 422/177; 60/274; 60/276; 60/277

[58] Field of Search ................................. 422/83, 98, 94, 422/108, 177; 60/274, 276, 277; 123/691; 73/118.1

[56] References Cited

U.S. PATENT DOCUMENTS

| | | | |
|---|---|---|---|
| 4,194,471 | 3/1980 | Baresel | 123/119 EC |
| 4,351,182 | 9/1982 | Schmidberger | 73/27 R |
| 4,742,808 | 5/1988 | Blümel | 123/489 |
| 4,831,838 | 5/1989 | Nagai et al. | 60/274 |
| 4,884,066 | 11/1989 | Miyata et al. | 340/633 |
| 5,095,878 | 3/1992 | Kumagai et al. | 123/489 |
| 5,115,639 | 5/1992 | Gopp | 60/274 |
| 5,134,847 | 8/1992 | Ogawa et al. | 60/274 |
| 5,259,189 | 11/1993 | Baier et al. | 60/274 |
| 5,337,555 | 8/1994 | Tokuda et al. | 60/276 |
| 5,337,557 | 8/1994 | Toyoda | 60/276 |
| 5,357,750 | 10/1994 | Ito et al. | 60/274 |
| 5,375,416 | 12/1994 | Iwata et al. | 60/276 |

FOREIGN PATENT DOCUMENTS

| | | |
|---|---|---|
| 0595586 | 5/1994 | European Pat. Off. . |
| 4306055 | 9/1993 | Germany . |
| 4331153 | 3/1994 | Germany . |
| 05163984 | 6/1993 | Japan . |

*Primary Examiner*—Nina Bhat
*Attorney, Agent, or Firm*—Leydig, Voit & Mayer, Ltd.

[57] ABSTRACT

An electronic concentration control system in which a first exhaust gas composition sensor located in an exhaust pipe downstream from a catalytic converter is connected to an input to a P.I. circuit which generates a control output signal comprising a succession of opposing triangular ramps. The system includes a second exhaust gas composition sensor located in the exhaust pipe upstream from the catalytic converter generating a signal which is fed to a proportional integral circuit whose integrating and multiplying coefficients are altered on the basis of the control signal.

14 Claims, 5 Drawing Sheets

ELECTRONIC CONCENTRATION CONTROL SYSTEM

BACKGROUND OF THE INVENTION

This invention relates to an electronic concentration control system.

Closed loop electronic concentration control systems in which an exhaust gas composition sensor (e.g. a lambda sensor) located in an exhaust pipe sends a feedback signal to a calculation unit which generates as an output a concentration correction signal used to calculate the air/gasoline ratio (strength) of the mixture delivered to the engine are known.

In particular the correction signal may be used to modify an injection time Tj calculated using an open loop, e.g. by means of an electronic map, calculating a corrected injection time Tjcorr in a closed loop.

Systems which use first and second exhaust gas composition sensors located upstream and downstream of a catalytic converter respectively are also in existence. In these systems these first sensors are used in active mode to calculate the concentration correction signal while the second sensors generally perform a passive control function and are used to detect any abnormalities in the functioning of the first sensors.

SUMMARY OF THE INVENTION

The object of this invention is to provide a concentration control system which is an improvement on known systems.

This object is accomplished by this invention in that it relates to an electronic system for concentration control which is suitable for application to an internal combustion engine having an exhaust pipe feeding exhaust gas to a catalytic converter, this system comprising:

- first exhaust gas composition sensor means located in the said exhaust pipe downstream from the said catalytic converter,
- first calculation means receiving as an input at least a first signal correlated to the signal (Slambda2) generated by the said first sensor means and generating as an output a control signal (K02),
- second exhaust gas composition sensor means located in the said exhaust pipe upstream from the said catalytic converter, characterised in that it incorporates second calculation means receiving as an input at least a second bistable alternating signal correlated with the signal (Slambda1) generated by the said second sensor means, the said second calculation means generating as an output a concentration modifying signal on the basis of the said control signal (K02) and the said second signal.

BRIEF DESCRIPTION OF THE DRAWINGS

The invention will now be illustrated with particular reference to the appended figures which show a preferred non-restrictive embodiment in which.

DETAILED DESCRIPTION OF THE INVENTION

Figure 1:
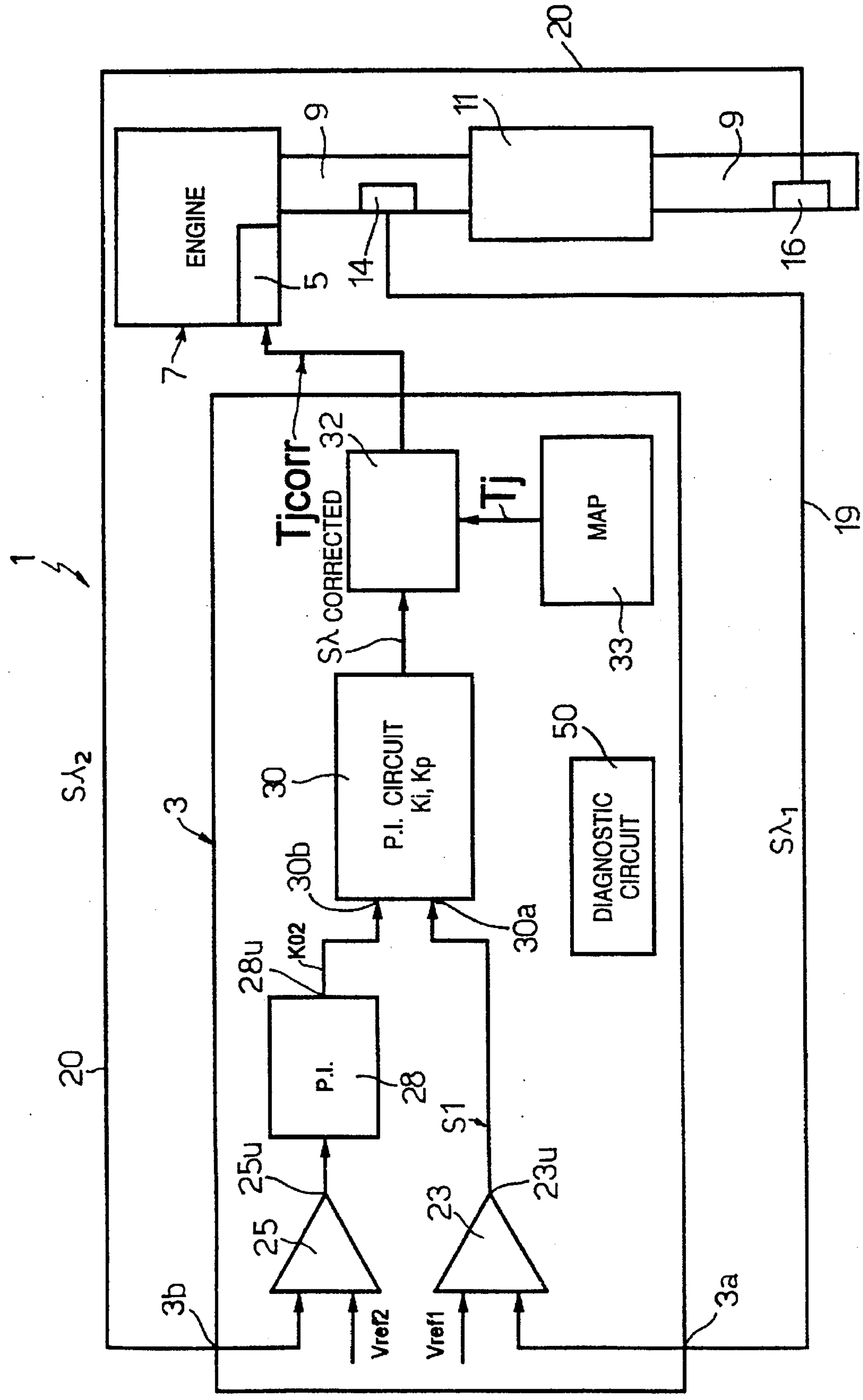
FIG. 1 illustrates diagrammatically an electronic concentration control system constructed in accordance with the dictates of this invention.

In FIG. 1, 1 indicates as a whole a concentration control system in which a central electronic unit containing a microprocessor 3 operates an injection system 5 (illustrated diagrammatically) of an endothermic combustion engine 7, in particular a gasoline-powered engine (shown diagrammatically).

In particular, engine 7 has an exhaust pipe 9 along which is provided a catalytic converter 11 (of a known type).

System 1 includes a first exhaust gas composition sensor 14 (sensor lambda1) placed in exhaust pipe 9 between engine 7 and catalytic converter 11 and a second exhaust gas composition sensor (sensor lambda2) located in exhaust pipe 9 downstream from catalytic converter 11.

Figure 3:
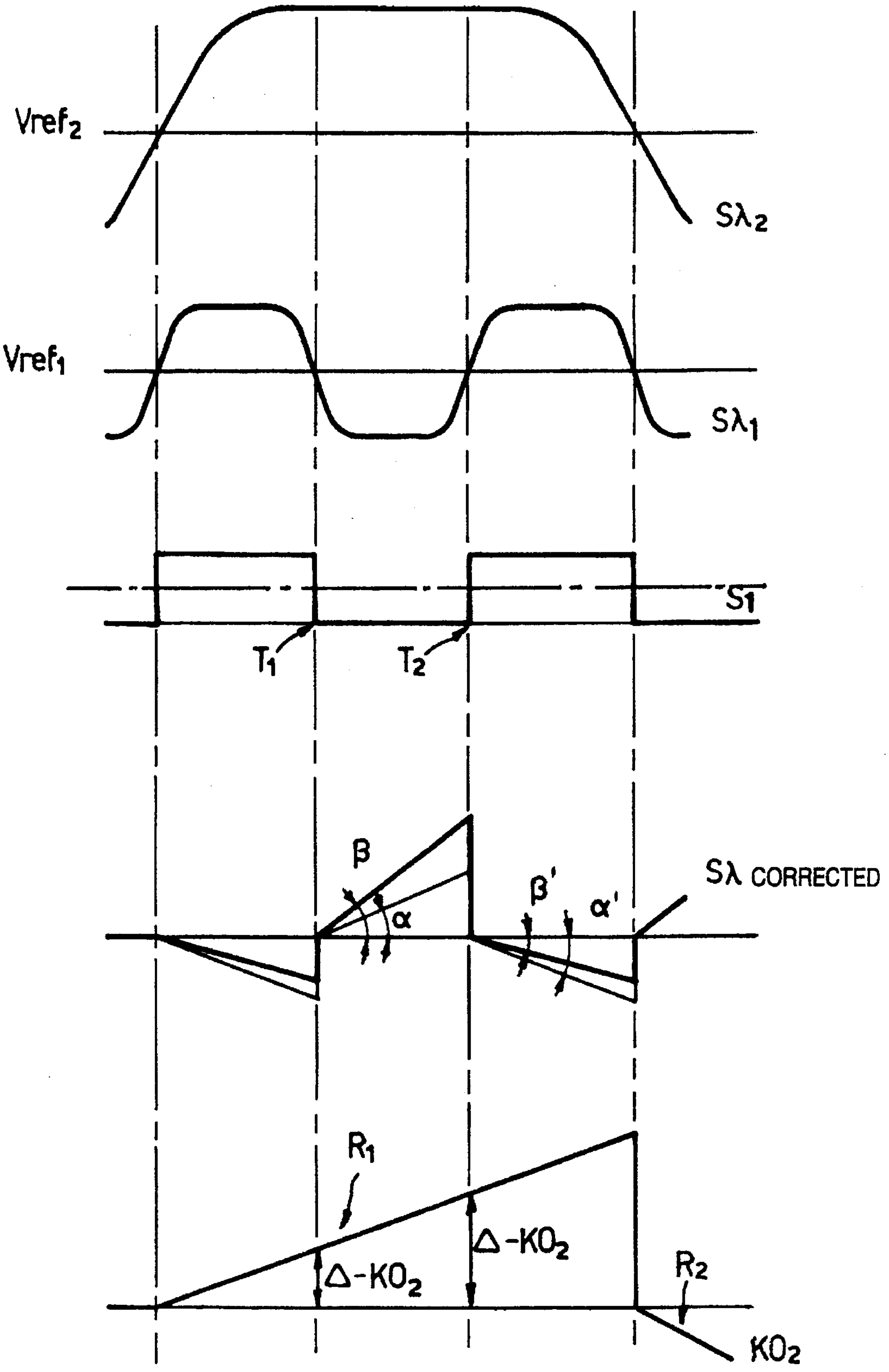
FIG. 3 shows the time trace of some parameters of the system according to this invention.

Lambda sensors 14, 16 are connected by electric lines 19, 20 to inputs 3*a*, 3*b* of central unit 3 and generate as outputs corresponding alternating signals S(lambda1), S(lambda2) which have the course illustrated in FIG. 3.

Signals S(lambda1), S(lambda2) have a typical alternating bistable course whose state depends on the stoichiometric composition of the exhaust gases present in exhaust pipe 9. In particular, if the air/gasoline mixture fed to engine 7 has more gasoline than is required by the stoichiometric ratio the signal generated by the lambda sensor adopts a high value (typically 800 millivolts), while if the air/gasoline mixture contains less gasoline than is required by the stoichiometric ratio the signal from the lambda sensor adopts a low value (typically 100 millivolts).

Central unit 3 includes a first comparator circuit 23 which receives the signal generated by lambda sensor 14 and a first reference signal Vref1 (e.g. a reference voltage), and a second comparator circuit 25 which receives the signal generated by lambda sensor 16 and a second reference signal Vref2 (e.g. a reference voltage).

Comparator circuits 25, 23 have outputs 25*u*, 23*u* communicating with a processor circuit 28 (e.g. a proportional-integral P.I. circuit) and a first input 30*a* to a circuit 30 respectively.

Circuit 28 has an output 28*u* communicating with a second input 30*b* to circuit 30.

Circuit 28 receives as an input a square wave signal (the signal produced by lambda sensor 16 compared with voltage vref2) and generates as an output a periodical signal K02, of the type shown in FIG. 3, produced by integrating the square wave signal (FIG. 3) and formed of a succession of positive triangular ramps R1 alternating with triangular negative ramps R2.

Circuit 30 is a proportional integral P.I. circuit having an integration coefficient Ki and a multiplication coefficient Kp, the value of which may be changed, in ways which will be described below, on the basis of signal K02.

Circuit 30 receives as its first input 30*a* a bistable alternating square wave signal S1 (FIG. 3) which is generated by comparing the signal produced by lambda sensor 14 with voltage Vref1.

Circuit 30 generates as an output, by means which will be described below, a concentration-altering signal Slambda-corrected (FIG. 3) which is fed to a calculation block 32 (of a known type) acting together with a circuit 33.

Circuit 33 receives as an input a plurality of engine parameters from engine 7, e.g. engine rotation speed N, cooling water temperature TH20, butterfly valve position Pbutt, amount of air drawn in Qa, and generates as an output, e.g. by means of electronic maps, an open loop injection time Tj which is fed to block 32 where time Tj is altered (in a known way) by the concentration-altering signal Slambda-corrected, generating injection time Tjcorr as an output in a closed loop.

System 1 also comprises a diagnostic circuit 50, which receives as an input a plurality of parameters measured on engine 7 and in block 32 and using means which will be described below controls the efficiency and functioning of lambda sensor 14.

Figure 2A:
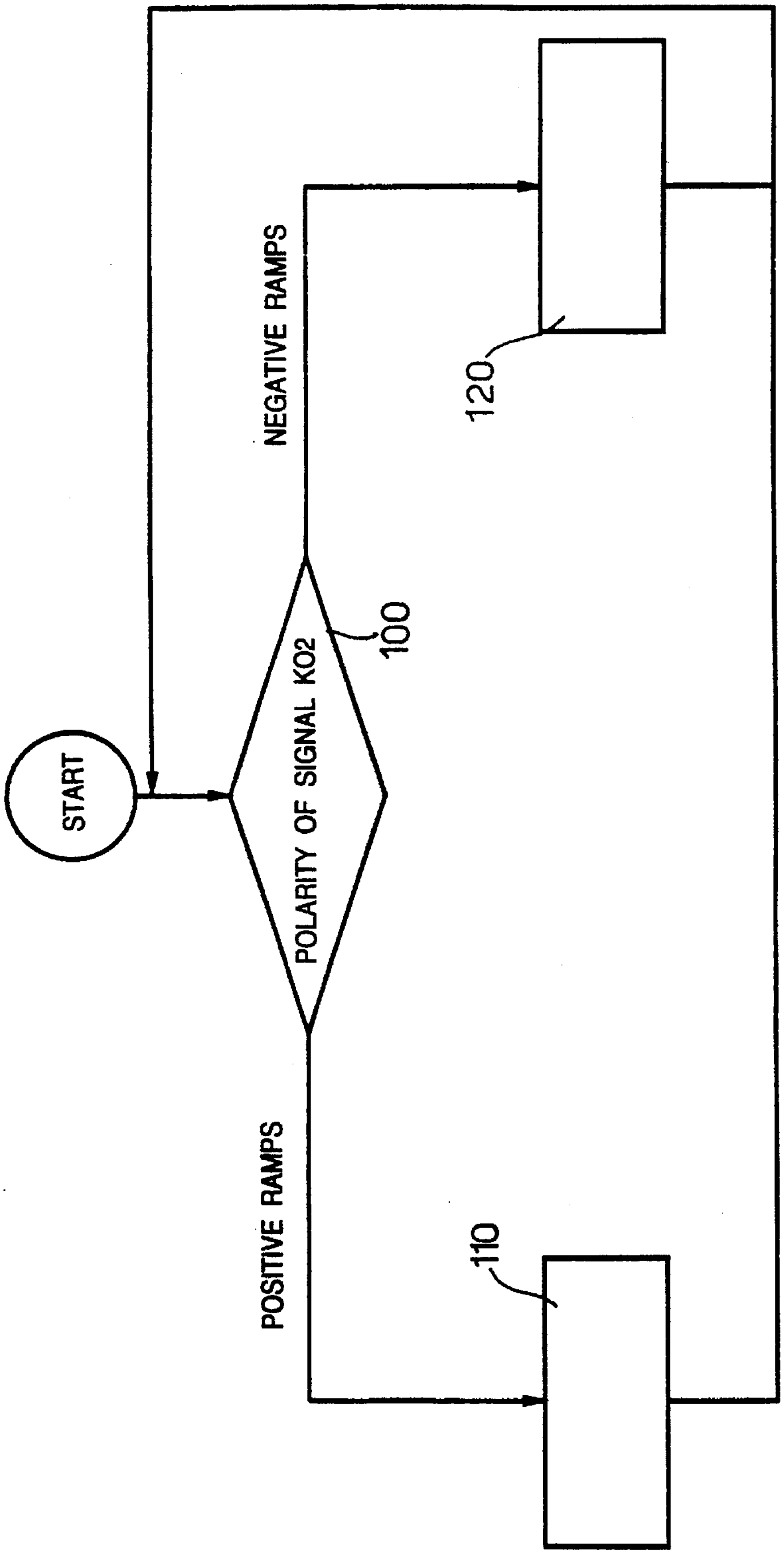
FIGS. 2*a*, 2*b*, 2*c* illustrate logic block diagrams of the system according to this invention.

The operations performed by circuit 30 in calculating the concentration-altering signal Slambda-corrected will now be illustrated with particular reference to FIG. 2*a*.

Initially a block 100 is reached, in which the polarity of the signal K02 fed to circuit 30 by circuit 28 is verified. If signal K02 is greater than zero (positive ramp R1) it passes from block 100 to a block 110, otherwise, if signal K02 is less than zero (negative ramp R2), it passes from block 100 to a block 120.

Block 110 alters the integration coefficient Ki of circuit 30, increasing this coefficient Ki during periods in which the square wave signal S1 fed to input 30*a* adopts a first state, and in particular is negative. Coefficient Ki (FIG. 3) is increased by a term DELTA-K02 whose magnitude is proportional to the magnitude of signal K02 at instant T1 when square wave signal S1 fed to input 30*a* changes state, becoming negative.

In this way, the slope of the positive ramps (angle beta) is increased (FIG. 3) with respect to the slope (angle alpha) which circuit 30 would supply to terminal Ki without the correction made by signal K02.

At the end of the positive ramp the proportional term Kp in circuit 30 is altered. In particular, the term Kp is increased by a term proportional to DELTA-K02.

Block 110 also alters the integration coefficient of the Ki of circuit 30, decreasing this integration coefficient Ki during periods in which square wave signal S1 fed to input 30*a* adopts a second state, and in particular is positive. Coefficient Ki is reduced by a correction term DELTA-K02 whose amplitude is proportional to the amplitude of signal K02 (FIG. 3) at instant T2 when square wave signal S1 changes state, becoming positive.

In this way the slope (angle beta') of the negative ramps (FIG. 3) is reduced with respect to the slope (angle alpha') which circuit 30 would provide without the correction made by signal K02.

At the end of the negative ramp the proportional term Kp of circuit 30 is altered, reducing it by a term proportional to DELTA-K02.

Signal K01 generated at the output from circuit 30 by block 110 produces the concentration-altering signal Slambda-corrected and comprises positive ramps with a slope greater than that of the negative ramps.

Block 120 changes the integration coefficient Ki of circuit 30, reducing this integration coefficient Ki during the periods in which the square wave signal fed to input 30*a* is negative. Coefficient Ki is reduced by a correction term DELTA-K02 whose magnitude is proportional to the magnitude of signal K02 at the moment when square wave signal S1 fed to input 30*a* changes state, becoming negative.

In this way the slope of the positive ramps is decreased with respect to the slope which circuit 30 would provide without the correction made by signal K02 to coefficient Ki.

At the end of the positive ramp the proportional term Kp for circuit 30 is changed. In particular, coefficient Kp is reduced by a term proportional to DELTA-K02.

Block 120 also alters integration coefficient Ki of circuit 30, increasing this integration coefficient Ki during periods in which the square wave signal S1 fed to input 30*a* is positive.

Coefficient Ki is increased by a term DELTA-K02 whose magnitude is proportional to the magnitude of signal K02 at the moment when the square wave signal changes, becoming positive.

At the end of the negative ramp the proportional term Kp which is increased by a term proportional to DELTA-K02 is changed.

The signal generated at the output from circuit 30 by block 120 produces concentration-altering signal Slambda-corrected and comprises positive ramps with a slope smaller than that of the negative ramps.

From blocks 110, 120 there is a cyclic return to block 100 as long as circuit 30 is active.

Concentration-altering signal Slambda-corrected is then fed to block 32 where this is used, in a known way, to alter the injection time Tj in an open loop by calculating the injection time Tjcorr in a closed loop.

Figure 2B:
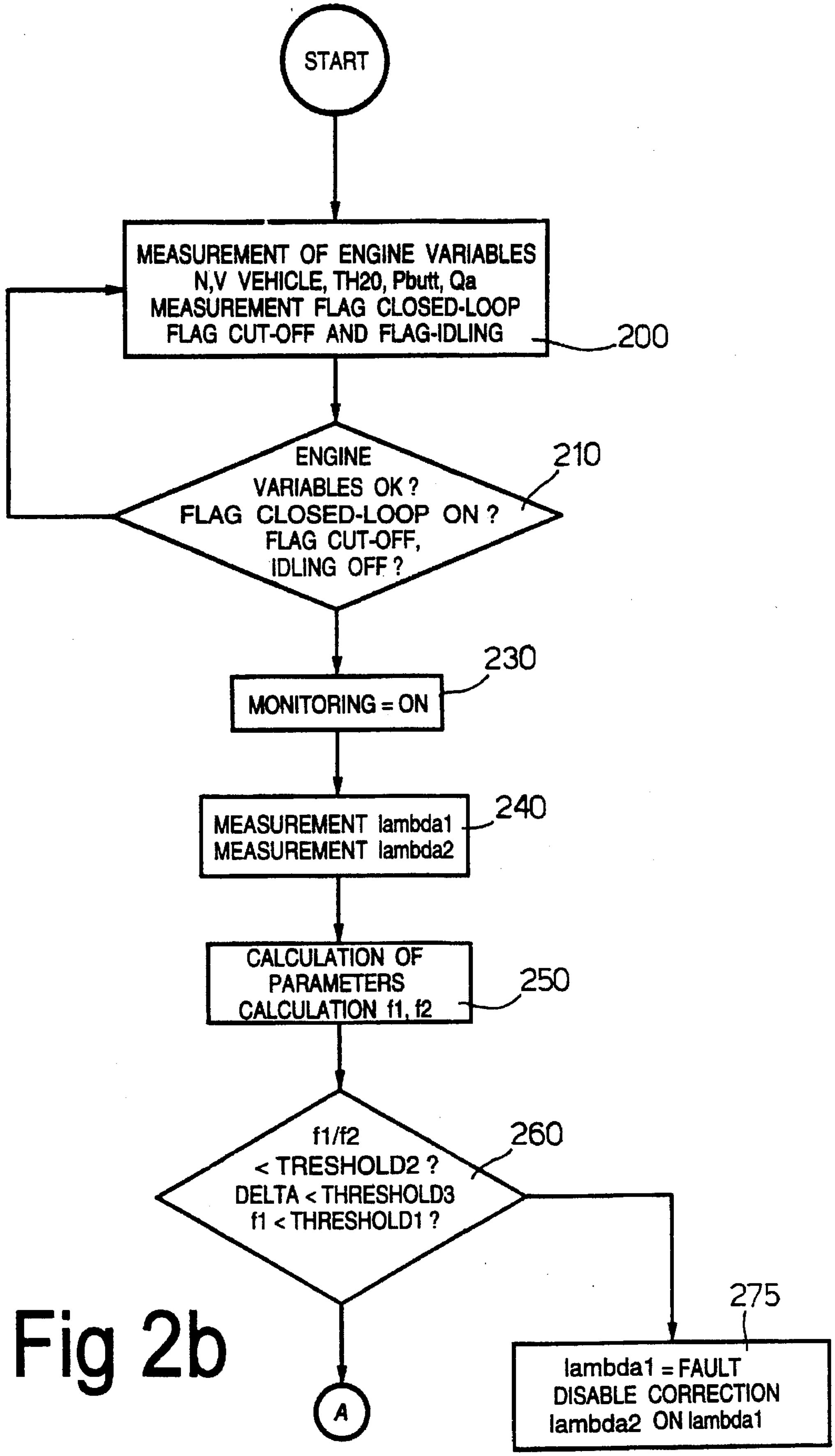
Figure 2C:
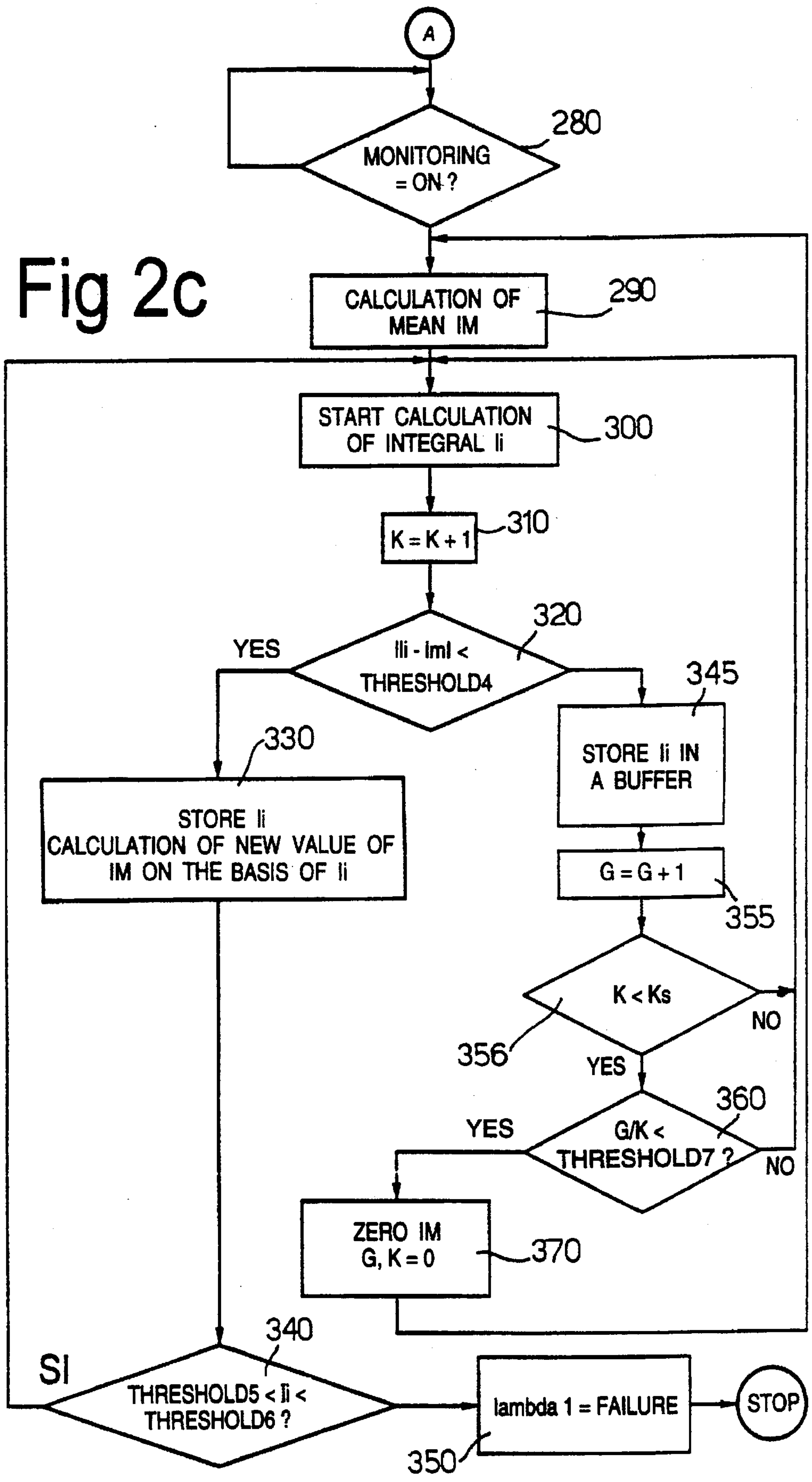

The diagnostic operations performed by diagnostic circuit 50 according to this invention are described with particular reference to FIGS. 2*b*, 2*c*.

Initially a block 200 is reached, in which a plurality of engine variables measured on engine 7 and on the vehicle (not illustrated) on which engine 7 is mounted are fed in. In particular, block 200 receives the engine rotation speed N7, the position Pbutt of the butterfly valve (not illustrated), the temperature TH20 of engine cooling water 7, the speed V of the vehicle (not shown) on which engine 7 is mounted, and the flow of air in the intake manifold Qa.

Block 200 acquires a first binary variable (FLAG CLOSED-LOOP) whose state (1 or 0) indicates whether system 1 is working in a closed loop or whether the loop is disabled.

Block 200 acquires a secondary binary variable (FLAG CUT-OFF) whose state (1 or 0) indicates whether engine 7 is working normally or whether the fuel feed to engine 7 has been cut off (CUT-OFF).

Block 200 also receives a third binary variable (FLAG IDLING) whose state (1 or 0) indicates whether engine 7 is idling or running under normal operating conditions.

Block 200 is followed by a block 210 in which the engine variables N, TH20, V, Pbutt and Qa measured in block 200 are compared with threshold values.

In particular, block 200 checks whether the values of variables N, TH20, V, Pbutt and Qa fall within predefined threshold values according to relationships of the type:

$$N\text{-low}<N<N\text{-high},$$

$$TH20\text{-low}<TH20<TH20\text{-high},$$

$$\text{Derivative (Pbutt)}<\text{threshold},$$

$$V\text{-low}<V<V\text{-high, and}$$

$$\text{Derivative (Qa)}<\text{threshold}. \quad [1]$$

Block 210 also checks whether system 1 is working in a closed loop, if engine 7 is receiving fuel and is not idling, i.e.:

FLAG CLOSED-LOOP=1,

FLAG CUT-OFF=0, and

FLAG IDLING=0. [2]

If [1] and [2] are verified simultaneously, block 210 hands over to a block 230, otherwise it returns to block 200.

Block 230 initialises a binary variable (MONITORING) whose state "1" (ON) indicates that the system is in a condition in which it is possible to perform a diagnostic cycle with success. Block 230 then performs the logic operation MONITORING=1.

Block 230 is followed by a block 240 which receives the signals Slambda1 and Slambda2 generated by lambda sensors 14 and 16.

Block 240 is followed by a block 250 in which the switching frequencies f1, f2 of the signals Slambda1 and Slambda2 are found. Block 250 also measures the maximum variation (DELTA) in the concentration-altering signal Slambda-corrected generated by circuit 30.

Block 250 is followed by a block 260 in which the variables processed in block 250 are compared with threshold values.

In particular, block 260 checks whether the switching frequency of sensor 14 is less than a threshold value and whether the ratio of the switching frequency of sensor 14 to sensor 16 is less than a threshold value, f1<THRESHOLD 1 f1/f2<THRESHOLD 2 [3]

where THRESHOLD 2 is close to unity or 2.

Block 260 also checks whether the variation (DELTA) in concentration-altering signal Slambda-corrected calculated in block 250 is less than a threshold value, i.e.:

DELTA<THRESHOLD 3 [4]

If relationships [3] and [4] are fulfilled at the same time, block 260 hands over to a block 280 (FIG. 2*c*), otherwise if relationships [3] and [4] are not fulfilled simultaneously it hands over to a block 275.

Block 275 produces an incorrect lambda sensor 14 signal and disables correction of the signal from lambda sensor 16 from the signal generated by lambda sensor 14.

Block 280 is ready awaiting the MONITORING=1 signal and on receiving this signal it hands over to a block 290.

Block 290 calculates the integral for the correction term DELTA-K02, i.e.:

$$Ii = \int_{START}^{STOP} \text{DELTA-K02}\, dt \qquad [5a]$$

The start (START) for the calculation of the integral is given by a MONITORING ON signal and the end of this calculation (STOP) takes place when a prefixed number of switchings of lambda sensor 14 have been achieved. The integration increment dt is given by the switching of lambda sensor 14.

The calculation of this integral I is repeated cyclically and a mean value Im is calculated, e.g. using an expression of the type:

$$Im = \sum_{i=1}^{N} \frac{Ii}{N}$$

Block 290 hands over to a block 300 after the mean value Im has been calculated.

Block 300 calculates the integral of the variation in the correction term DELTA-K02:

$$Ii = \int_{START}^{STOP} \text{DELTA-K02}\, dt \qquad [5b]$$

The start (START) of the calculation of integral [5] is given by a MONITORING ON signal and the end of the calculation (STOP) occurs when a prefixed number of switchings of lambda sensor 14 are completed.

Block 300 is followed by a block 310 in which the contents of a binary counter K are incremented by one unit through the logic operation K=K+1.

Block 310 is followed by block 320 in which the value of the integral Ii calculated in block 300 is compared with the average value Im calculated in block 290. In particular, if integral Ii differs little from the mean value Im, i.e. |Im−Ii|<THRESHOLD4, block 320 hands over to a block 330, otherwise block 345 is reached.

Block 330 temporarily stores the value of the integral Ii calculated by block 300 and updates the mean value Im in use (calculated from block 290) on the basis of this Ii value. At the end of the recalculation the mean value Im is passed to a block 340.

Block 340 checks whether the value of the integral Ii calculated in block 300 lies between two threshold values, THRESHOLD5<Ii<THRESHOLD6 [6]

THRESHOLD4 is a non-linear function of Ii and THRESHOLD5, THRESHOLD6.

Where [6] is verified by block 340 it hands back to block 300 where a further calculation of the integral Ii is performed, otherwise (if an anomalous value of the integral Ii is found) it returns to block 350.

Block 350 issues a signal which indicates a functional anomaly in lambda sensor 14. The programme is exited from block 350.

Block 345 stores the value of the integral Ii calculated in a buffer memory. This block 345 is followed by a block 355 in which the contents of a binary counter G are incremented by one unit, in accordance with the logic operation G=G+1.

Block 355 is followed by a block 356 in which the value of K in use is compared with a threshold value Ks. Where this value K is less than the threshold Ks a return is made to block 300, otherwise block 356 hands over to block 360.

In block 360 the ratio between the contents of counters G and K are compared with a threshold value, i.e.:

G/K<THRESHOLD7 [7]

If condition [7] is not fulfilled (G/K<THRESHOLD7), block 360 hands back to block 300, otherwise (G/K= THRESHOLD) block 360 hands over to a block 370.

Block 370 zeroes counters G and K (G=0; K=0) and zeroes the mean value of the integral Im calculated by block 290.

Block 370 is then followed by block 290 which recalculates mean value Im.

When in use, the diagnostic system comes into operation when the variables found by block 200 fall within the "windows" established in block 210.

Diagnostic system 1 then performs a first diagnosis (also called a pre-diagnosis) using block 260 to check any functional anomaly in lambda sensor 1. This functional anomaly is mainly found when the frequencies of lambda sensors 14, 16 approach each other substantially (f1/f2= THRESHOLD2, with THRESHOLD2 near to unity), when f1 is less than a threshold and when the concentration-altering signal is temporarily high.

The diagnostic system then enters into an initialisation stage calculating the mean value Im of the integral for the correction term DELTA-K02 (block 290), and at the end of this stage it cyclically compares the values of integral Ii calculated by block 300 with the mean value Im. The percentage G/K is then calculated (block 360) and expressed as the number (G) of Ii integrals calculated which differ substantially from the mean value with respect to the total number (K) of the integral calculations.

If this percentage exceeds the threshold (block 360) and if a sufficient number of calculations have been made (block 356) a new stage of calculating the mean value of integral Im is initiated (block 290).

The calculated value Ii of the integral is then compared with the thresholds specified by block 340 in order to detect an integral Ii which has an anomalous value indicating a malfunction in lambda sensor 1 (block 350).

The advantages of this invention will be clear from the above, given that the signal generated by lambda sensor 16 is actively used to alter and correct the signal generated from lambda sensor 14: This system makes it possible to calculate the injection time with extreme accuracy.

Diagnostic circuit 50 also makes it possible to maintain the whole of system 1 under constant monitoring, immediately detecting any faults (blocks 275, 350) in the system.

Finally it is clear that amendments and variants may be made to the system described without thereby going beyond the protective scope of this invention.

We claim:

1. An electronic concentration control system capable of being applied to an internal combustion engine which has an exhaust pipe delivering exhaust gas to a catalytic converter, the system comprising:

a first exhaust gas composition sensor located in the exhaust pipe downstream from the catalytic converter for sensing the engine exhaust and generating a first exhaust gas composition control signal;

a second exhaust gas composition sensor located in the exhaust pipe upstream from the catalytic converter for sensing the engine exhaust and generating a second exhaust gas composition control signal; and a central unit for determining and providing a fuel injection time correction signal to the engine in response to the first and second exhaust gas composition control signals, the central unit comprising:

a comparator for generating first and second exhaust signals correlated with the first and second exhaust gas composition control signals, respectively;

a first proportional integrator generating a P.I. control signal in response to the first exhaust signal;

a second proportional integrator having an integration coefficient for generating a concentration altering signal in response to the second exhaust signal and the polarity of the P.I. control signal; and a fuel time corrector generating the fuel injection time correction signal in response to the concentration altering signal and a predetermined injection time value; wherein the second proportional integrator alters the integration coefficient on the basis of the P.I. control signal.

2. A system according to claim 1, wherein the first proportional integrator generates the P.I. control signal formed of a succession of positive triangular ramps alternating with negative triangular ramps.

3. A system according to claim 1, wherein each of the second exhaust and P.I. control signals has first and second states, and the second proportional integrator, in response to the P.I. control signal in the first state, increases the integration coefficient during the first state of the second exhaust signal, and decreases the integration coefficient during the second state of the second exhaust signal; and the second proportional integrator, in response to the P.I. control signal in the second state, decreases the integration coefficient during the first state of the second exhaust signal, and increases the integration coefficient during the second state of the second exhaust signal.

4. A system according to claim 3, wherein the second proportional integrator increases a proportional coefficient in response to the P.I. control signal in the first state during the first state of the second exhaust signal, and decreases the proportional coefficient during a second state of the second exhaust signal; and the second proportional integrator, in response to the P.I. control signal in the second state, decreases the proportional coefficient during the first state of the second exhaust signal, and increases the proportional coefficient during the second state of the second exhaust signal.

5. A system according to claim 3, wherein the second proportional integrator increases the integration coefficient by an amount proportional to the value of the P.I. control signal when the second exhaust signal changes state, and decreases the integration coefficient by an amount proportional to the value of the P.I. control signal when the second exhaust signal changes state.

6. A system according to claim 5, wherein the central unit further comprises a diagnostic controller for detecting malfunction conditions, wherein the diagnostic controller integrates a plurality of the amounts proportional to the value of the P.I. control signal and compares the integration result with a predetermined threshold range; the diagnostic controller causing the fuel time corrector to generate the fuel injection time correction signal based on the predetermined injection time value, without adjustment based on the concentration altering signal, when the integration result exceeds the predetermined threshold range.

7. A system according to claim 6, wherein the diagnostic controller determines a mean value of a series of the integration results and compares a difference between the mean value and the integration result with a predetermined threshold value;

the diagnostic controller compares the integration result with a predetermined threshold range when the integration result is substantially equal to the integration result, causing the fuel time corrector to generate the fuel injection time correction signal based on the predetermined injection time value, without adjustment based on the concentration altering signal, when the integration result exceeds the predetermined threshold range.

8. A system according to claim 7, wherein the diagnostic controller, when the current integration result is substantially equal to the current mean value, determines a new mean value of the series of the integration results inclusive of the current integration result.

9. A system according to claim 7, wherein the diagnostic controller determines the ratio between the number of integral results which differ substantially from the mean value and the total number of integral results, wherein the diagnostic controller compares the ratio with a threshold value and when the mean value exceeds the threshold value, the diagnostic controller sets the mean value, the number of integral results which differ substantially from the mean value, and the total number of integral results each to zero, and then determines a new mean value based on the current integral result.

10. A system according to claim 1, wherein the central unit further comprises a diagnostic controller for detecting malfunction conditions in the second exhaust gas composition sensor, the diagnostic controller causing the fuel time corrector to generate the fuel injection time correction signal based on the predetermined injection time value, without adjustment based on the concentration altering signal, upon detection of a malfunction condition.

11. A system according to claim 10, wherein the central unit further comprises a diagnostic state for verifying the operation of the electronic concentration control system, and the diagnostic controller monitors at least one information signal measured on the internal combustion engine and compares the value of the information signal with a predetermined threshold value; wherein the central unit enters the diagnostic state in response to the value of the information signal exceeding the predetermined threshold value.

12. A system according to claim 10, wherein the diagnostic controller further comprises: a first and a second detector for detecting first and second switching frequencies in the first and second exhaust gas composition control signals respectively, the diagnostic controller comparing magnitudes correlated with the first and second switching frequencies with predetermined threshold values; the diagnostic controller causing the fuel time corrector to generate the fuel injection time correction signal based on the predetermined injection time value, without adjustment based on the concentration altering signal, when at least one of the magnitudes exceeds its respective predetermined threshold value.

13. A system according to claim 12, wherein the diagnostic controller compares the first switching frequency with a predetermined threshold value and compares the ratio between the first switching frequency and the second switching frequency with a predetermined threshold value, the diagnostic controller causing the fuel time corrector to generate the fuel injection time correction signal based on the predetermined injection time value, without adjustment based on the concentration altering signal, when either the first switching frequency or the ratio exceeds its respective predetermined threshold value.

14. A system according to claim 12, wherein the diagnostic controller calculates a maximum variation in the concentration-altering signal and compares the maximum variation with a predetermined threshold value, the diagnostic controller causing the fuel time corrector to generate the fuel injection time correction signal based on the predetermined injection time value, without adjustment based on the concentration altering signal, when the maximum variation exceeds the third predetermined threshold value.

* * * * *